April 11, 1944.  W. U. MATSON  2,346,175
POWER TRANSMISSION SYSTEM
Filed July 3, 1942
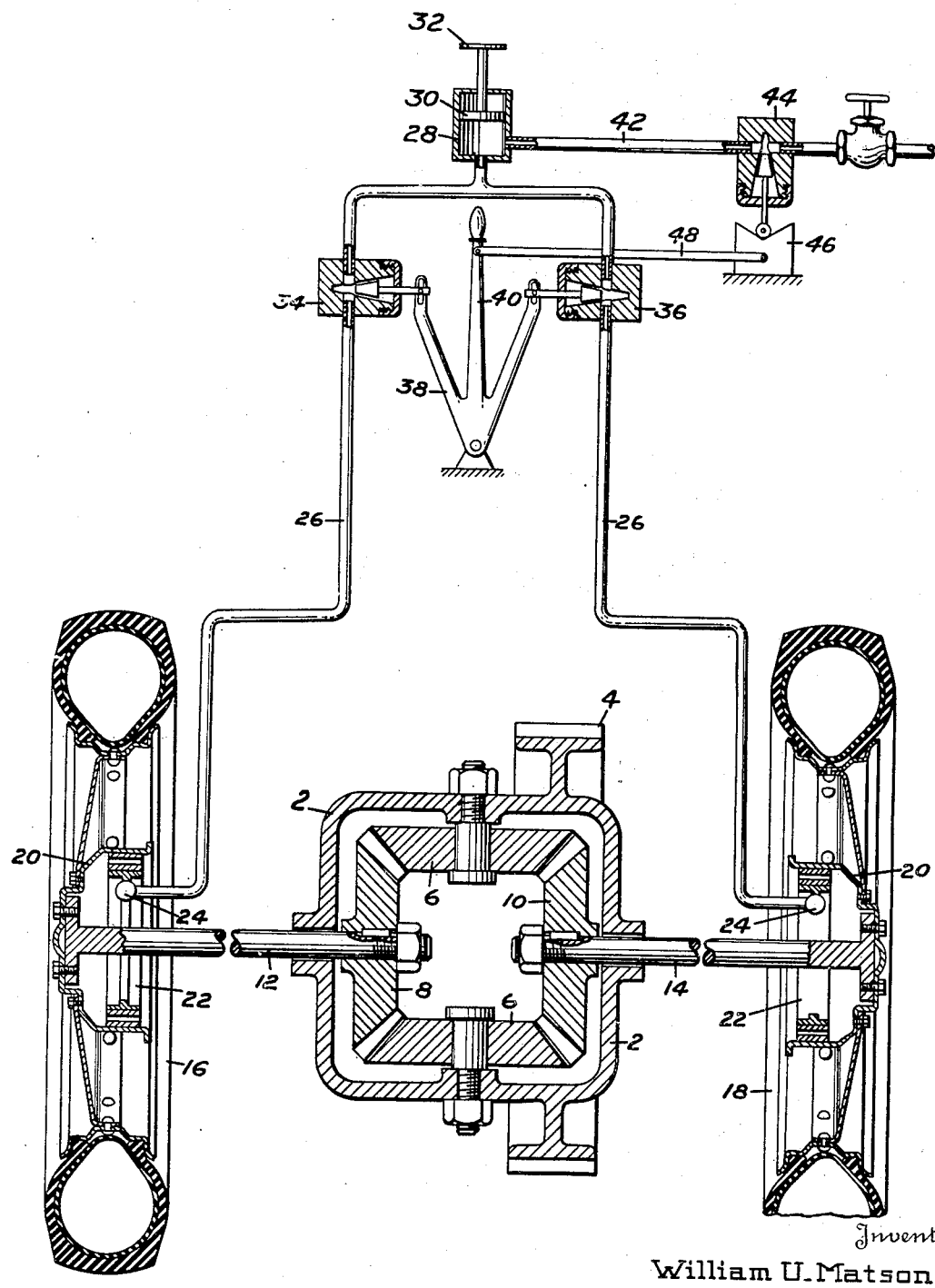
Inventor
William U. Matson
By G. J. Kesenich & J. H. Church
Attorneys Patented Apr. 11, 1944

2,346,175

UNITED STATES PATENT OFFICE 2,346,175

POWER TRANSMISSION SYSTEM

William U. Matson, Arlington, Va.

Application July 3, 1942, Serial No. 449,590

2 Claims. (Cl. 188—152)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to drive systems for self-powered wheeled vehicles, particularly to those in which the power is transmitted through a differential to a pair of drive wheels.

Many drivers of automotive vehicles have at some time or other found themselves in the annoying predicament of being stuck in a snowdrift, muddy road, or the like, where one driving wheel is resting on such a slippery spot that the coefficient of friction is too low to provide traction, with the result that that wheel spins dissipating all the driving power of the engine, and the vehicle stands still. The characteristics of differentials in general use on automotive vehicles are such that the wheel with no traction spins, and the wheel that has a good coefficient of friction with the road receives no torque.

It is the object of this invention to provide a vehicle drive system in which the spinning wheel may be loaded sufficiently to insure that some of the engine torque will be transmitted to the other wheel. This is accomplished by means for braking the spinning wheel. Such a system is easily adapted to fluid pressure brake systems by the expedient of providing valves in the fluid pressure lines to permit blocking the transmission of fluid pressure to those lines which connect the pedal cylinder with the brakes of wheels not spinning. The valves in the conduits to the brakes of the driving wheels may be interlocked, so that when one line or conduit is blocked, the other remains open.

The sole figure of the drawing shows a wheeled vehicle differential with the driving wheels of the vehicle and a fluid pressure brake system embodying the invention.

Referring to the drawing in detail, a differential frame 2 is shown carrying a gear 4 which is positioned to be driven by a propeller shaft pinion (not shown) in the usual manner. Frame 2 carries the conventional idler gears 6 which mesh with side gears 8 and 10. Gears 8 and 10 are keyed to halves 12 and 14, respectively, of the rear axle. Axle halves 12 and 14 are secured to drive wheels 16 and 18, respectively, in any suitable manner. Each wheel is equipped with a brake drum 20 and a brake shoe 22. Shoe 22 may be actuated into contact with drum 20 by any suitable means, but preferably by a fluid pressure system consisting of cylinders 24 (not shown in detail), conduits 26, and master brake cylinder 28. Piston 30 of cylinder 28 is adapted to be actuated by any suitable means such as pedal 32.

At any convenient point in conduits 26 are disposed valves 34 and 36, the actuating rods of which are connected to bell crank 38. Operating lever 40 is secured to the bell crank. A conduit 42 leads from master cylinder 28 to the brakes of wheels not connected to a differential, such as the forward wheels of an ordinary automobile. A valve 44 is disposed in conduit 42. The actuating rod of valve 44 is disposed for actuation by cam 46 connected by link 48 to lever 40. As can be seen from the drawing, movement of lever 40 in either direction, to close either valve 34 or valve 36, results in the closing of valve 44. Furthermore, the arrangement of lever 40 with valves 34 and 36 is such that only one of these valves can be closed at one time.

*Operation.*—When the vehicle is stopped in a mud hole or a snow bank because one wheel spins, the operator determines which wheel is spinning, and manipulates lever 40 accordingly. If the left wheel is stationary, lever 40 is moved to the left as seen in the drawing. This act closes the brake conduit to the left rear wheel, and at the same time closes the brake conduits to the front wheels through link 48 and cam 46. The only brake conduit remaining open is the one to the right rear wheel. Then, again applying power to the rear axle, with the right wheel turning freely, the operator gradually applies pressure to pedal 32, slowly braking wheel 18. As the torque on wheel 18 increases, more and more of the engine power will be forced to wheel 16, until the engine torque on that wheel is great enough to turn the wheel. As soon as the vehicle has moved enough to take wheel 18 off the "slick" spot, lever 40 can be returned to the neutral position, and the vehicle thenceforward be operated in the usual manner, with the brakes off.

I claim:

1. In a vehicle drive system, a plurality of wheels some of which are driven wheels, a differential through which power is transmitted to the driven wheels, a brake on each wheel, fluid pressure means for operating the brakes including a master brake cylinder and fluid conduits leading from said cylinder directly to all the brakes, a fluid control valve in each of the conduits leading from said cylinder to the brakes of the differentially mounted drive wheels and a fluid control valve in the conduit leading from said cylinder to the other wheels, a manually operable device for controlling the valves and arranged to close the valve in one conduit to the brake of one differentially mounted wheel and close the valve of the other conduit, accordingly as said device is moved in one direction or the other, and connections between the device and the valve controlling the conduit to the other wheels to close said valve regardless of the direction in which said device is moved.

2. In a vehicle drive system, a plurality of wheels some of which are driven wheels, a differential through which power is transmitted to the driven wheels, a brake on each wheel, fluid pressure means for operating the brakes including a master brake cylinder and fluid conduits leading from said cylinder directly to all the brakes, a fluid control valve in each of the conduits leading from said cylinder to the brakes of the differentially mounted drive wheels, and a fluid control valve in the conduit leading from said cylinder to the other wheels, a manually operable lever, connections between said lever and the valves connecting the conduits leading to the differentially mounted wheels, which when moved in one direction from normal closes the valve in the conduit to the brake of one differentially mounted wheel and in the other direction closes the valve to the other differentially mounted wheel, operable connections between the lever and a cam device shaped to close the valve in the conduit between the master cylinder and the other wheels regardless of the direction in which the operating lever is moved.

WILLIAM U. MATSON.